United States Patent
Urazoe

(10) Patent No.: US 7,203,795 B2
(45) Date of Patent: Apr. 10, 2007

(54) DIGITAL RECORDING, REPRODUCING AND RECORDING/REPRODUCING APPARATUS

(75) Inventor: Mitsuhiro Urazoe, Sagamihara (JP)

(73) Assignee: D & M Holdings Inc., Kawasaki-shi (JP)

( * ) Notice: Subject to any disclaimer, the term of this patent is extended or adjusted under 35 U.S.C. 154(b) by 541 days.

(21) Appl. No.: 10/673,707

(22) Filed: Sep. 29, 2003

(65) Prior Publication Data

US 2004/0208096 A1 Oct. 21, 2004

(30) Foreign Application Priority Data

Apr. 18, 2003 (JP) ............................ 2003-146980
Apr. 24, 2003 (JP) ............................ 2003-153502

(51) Int. Cl.
*G06F 13/00* (2006.01)

(52) U.S. Cl. ........................... 711/113; 710/53; 710/68; 710/69

(58) Field of Classification Search ................. 710/53, 710/68, 69, 52; 711/113; 369/47.32, 53.31
See application file for complete search history.

(56) References Cited

U.S. PATENT DOCUMENTS

| | | | |
|---|---|---|---|
| 3,872,503 A | | 3/1975 | Shutterly et al. |
| 5,438,643 A | * | 8/1995 | Akagiri et al. ............... 704/201 |
| 5,530,750 A | * | 6/1996 | Akagiri ....................... 704/500 |
| 6,009,386 A | * | 12/1999 | Cruickshank et al. ....... 704/207 |
| 6,295,409 B1 | | 9/2001 | Ikeda |
| 6,608,803 B2 | | 8/2003 | Inoue et al. |
| 6,640,145 B2 | * | 10/2003 | Hoffberg et al. ............... 700/83 |

FOREIGN PATENT DOCUMENTS

| | | |
|---|---|---|
| EP | 0 559 104 | 9/1993 |
| EP | 1 162 606 | 12/2001 |
| GB | 2 343 049 | 4/2000 |
| WO | WO- 00/19426 | 4/2000 |

OTHER PUBLICATIONS

Sundaram H et al: "Video scene segmentation using video and audio features" Multimedia and Expo, 2000. ICME 2000. 2000 IEEE International Conference on New York, NY, USA Jul. 30-Aug. 2, 2000, Piscataway, NJ, USA, IEEE, US, vol. 2, Jul. 30, 2000, pp. 1145-1148, XP010513212 ISBN: 0-7803-6536-4 *the whole document*.

Wang Y et al: "Multimedia Content Analysis" IEEE Signal Processing Magazine, IEEE Service Center, Piscataway, NJ, US, Nov. 2000, pp. 12-36, XP002243709 ISSN: 1053-5888 *the whole document*.

* cited by examiner

*Primary Examiner*—Fritz Fleming
*Assistant Examiner*—Vincent Lai
(74) *Attorney, Agent, or Firm*—Jordan and Hamburg LLP

(57) ABSTRACT

A recording/reproducing apparatus for recording a received signal as digital data in a file format and for reproducing the digital data stored in the file format includes a memory controller which controls the recording made in a manner such that the digital data continuously received and stored in a buffer memory is stored in a storage unit at a writing speed which is higher than a speed at which the digital data is stored in the buffer memory. In a reproducing mode, the digital data is read from the storage unit into the buffer memory at a reading speed which is higher than a speed at which the digital data is outputted from the buffer memory to the outside.

15 Claims, 9 Drawing Sheets

DIGITAL RECORDING, REPRODUCING AND RECORDING/REPRODUCING APPARATUS

BACKGROUD OF THE INVENTION

This invention relates generally to a recording apparatus, a reproducing apparatus and a recording/reproducing apparatus which record a received signal and/or reproduce such signal in the form of digital data, and more particularly to such a recording apparatus, a reproducing apparatus and a recording/reproducing apparatus in which the digital data is divided into files at an arbitrary instant in response to a dividing operation, the digital data being recorded and/or reproduced as files thus obtained.

There have been know a recording apparatus for recording a received audio signal in the form of digital data, a reproducing apparatus for reproducing recorded digital data and a recording/reproducing apparatus for recording and/or reproducing an audio signal in the form of digital data.

In the area of such a recording apparatus, a reproducing apparatus and a recording/reproducing apparatus, there is a need for means which enables the operator to search for a particular position (i.e., to skip to the top of a particular section) in an easy manner in the play mode as in the case where the operator uses a voice recorder or the like.

Conventionally, a number of techniques have been known which relate to searching for the recorded digital data one of which is described, for example, in Japanese Patent Application Laid-Open No. H06-203539 (see page 1 and FIG. 1).

In the recording apparatus, the reproducing apparatus and the recording/reproducing apparatus as disclosed in the above-mentioned patent application laid-open document, to make a search operation in the play mode easy, mark information is used for such a search for an arbitrary position which the operator desires (so-called index mark file system). In this case, an index file in which mark information is recorded is created separately. This index file is constituted by a file number (or a file name) of the digital data, position information of the mark information (information about the time period from the start position of reproduction to the mark information) contained in the file, other attributes and so on.

However, the method according to the above-mentioned index mark file system has a problem that a search operation based on the mark information can only be performed among apparatus types which are compatible since, among other things, the order of processing of data is specific to each apparatus type and different from apparatus to apparatus. With the index mark file system, there is another problem that, since the number of pieces of mark information representing the positions to be searched for (i.e., the number of indices) is set to a certain value in advance to limit the number of indices (the number of marks), it is impossible to provide positions to be searched for which are in excess of the set number.

On the other hand, there is known another method which, for the purpose of enabling a search operation to be surely effected even among non-compatible apparatuses, temporarily stops the recording in the recording mode at a position which is desired to be searched for and allows the recording to be manually divided into files (manual file division system). By the use of such a method, an advantage is obtained that no problem of compatibility will occur among different types of apparatuses since the position which is desired to be searched for is always located at the top of each file.

With the above-described manual file division system, however, a certain amount of time is needed for stopping the recording of the directly preceding file and starting the recording of the current file, i.e., the processing of closing and opening files, which leads to another problem that the recording cannot be done in a continuous manner. That is to say, when a continuous signal is being received, a missing part will occur in the recording. In addition, when a plurality of files is continuously reproduced, the reproduction will temporarily be interrupted when transferring to the next file.

SUMMARY OF THE INVENTION

In view of the above, there is a need to realize a recording apparatus which enables a continuous recording to be done while maintaining compatibility among different types of apparatuses and also enables a search for an arbitrary position to be achieved; a reproducing apparatus which enables a search for an arbitrary position to be achieved while maintaining compatibility among different types of apparatuses and also enables a plurality of files to be reproduced in a continuous manner; and a recording/reproducing apparatus which enables a continuous recording to be done while maintaining compatibility among different types of apparatuses and also enables a search for an arbitrary position and a continuous reproduction of a plurality of files to be achieved.

It is possible to solve the above problems by providing a buffer memory for temporarily storing a received signal as digital data, a storage means for storing the digital data as files, a control means for carrying out a control to store the digital data temporarily stored in the buffer memory into the storage means as files, and a manual input means for inputting a division command for dividing the digital data at an arbitrary instant, wherein the control means carries out such the control in such a manner that the digital data continuously received and stored in the buffer memory is divided into files in response to the division command from the manual input means and stored in the storage means with a writing speed which is higher than the speed at which it has been stored in the buffer memory.

With the recording apparatus, the reproducing apparatus and the recording/reproducing apparatus having the above-described structure, the problem of non-compatibility, the problem that there is a limit to the number of search positions and the problems that a continuity can not be achieved and a missing part will occur in the recording and a similar missing part will also occur in the play mode will be solved. However, with the structure that the digital data can be divided into files only, there will arise a new problem that the operator cannot perform the division into files at an intended instance when the operation timing is deviated, with the result that a search for the desired position cannot be achieved. To solve this problem, another problem will arise that a skill of the operator is needed. In addition, when creating a file of a desired size, in particular when creating a plurality of files in succession, the operator has to perform the file creating operations sitting in front of the apparatus all the time.

Furthermore, in the case where the received signal is, for example, from a security camera or in the case where the received signal is representative of a natural phenomenon or the like wherein an instant when a change of such phenomenon is captured must be searched for, it is hard for the operator to objectively determine the timing of file division.

The present invention has been made in view of the above situations and has an object to provide a recording apparatus in which a continuous recording and a search for an arbitrary position can be achieved while maintaining compatibility among different types of apparatuses.

It is another object of the invention to provide a reproducing apparatus in which a continuous reproduction of a plurality of files and a search for an arbitrary position can be achieved while maintaining compatibility among different types of apparatuses.

It is a further object of the invention to provide a recording/reproducing apparatus in which a continuous recording, a continuous reproduction of a plurality of files and a search for an arbitrary position can be achieved while maintaining compatibility among different types of apparatuses.

It is a still further object of the invention to provide a recording apparatus, a reproducing apparatus and a recording/reproducing apparatus in which the compatibility among different types of apparatuses is maintained, there is no limit to the number of positions to be searched for, a continuity of recording and/or reproduction is maintained so that no missing part occurs, a file division at an intended instance can be achieved without the need for a skill of the operator, the operator is released from the constant attendance to operate the apparatus to create files, and a file division at an appropriate position can be achieved based on an objective judgment.

The above-described objects are achieved by respective measures which will be described below.

(1) A first invention is a recording apparatus for recording a received signal as digital data in a file format which is characterized by comprising a buffer memory for temporarily storing the received signal as digital data; a storage means for storing the digital data as files; a control means for performing a control to cause the digital data temporarily stored in the buffer memory to be stored in the storage means as files; and a manual input means for inputting a division command for dividing the digital data at an arbitrary instant; wherein the control means carries out the control in such a manner that the digital data continuously received and stored in the buffer memory is stored in the storage means at a writing speed which is higher than a speed at which the digital data was stored in the buffer memory, while being divided into files in response to the division command from the manual control means.

In the recording apparatus with the above structure according to the invention, such a control is performed that the digital data continuously received and stored in the buffer memory is stored in the storage means at a writing speed, which is higher than the speed at which the digital data was stored in the buffer memory, while being divided into files in response to the division command from the manual input means.

Thus, by virtue of the control that the digital data is stored in the storage means at the writing speed higher than the speed during its storage into the buffer memory, wherein the digital data is divided into files at each instant of division command, no missing part will occur in the recording even when a continuous signal is being received. More specifically, although a certain amount of time is needed for the file closing and file opening processing to stop recording the directly preceding file and to start recording the current file at the position to be searched for, since the total time period necessary for closing the file, opening the file and writing the digital data may be shorter than the time period necessary for receiving the digital data, no problem will arise in performing a continuous recording.

In addition, in the recording apparatus with the above structure not an index mark file system but a file division system is employed for searching for the top of a desired part of the recorded digital data, compatibility among different types of apparatuses is established. Furthermore, since there is no limit to the number of marks in the file division system, any desired number of search positions can be provided, whereas in the conventional system such as the index mark file system wherein the number of marks must be preset there is a limit to the number of search positions as its result, so that searches in excess of such number are not possible.

Thus, it becomes possible to provide a recording apparatus in which compatibility among different types of apparatuses is achieved and an arbitrary number of arbitrary positions can be searched for while carrying out a continuous recording.

(2) A second invention is a recording apparatus for recording a received signal as digital data in a file format which is characterized by comprising a buffer memory for temporarily storing the received signal as digital data; a storage means for storing the digital data as files; a control means for performing a control to cause the digital data temporarily stored in the buffer memory to be stored in the storage means as files; and a division managing means for generating a division timing signal for dividing the digital data at an arbitrary instant; wherein the control means carries out the control in such a manner that the digital data continuously received and stored in the buffer memory is stored in the storage means at a writing speed which is higher than a speed at which the digital data was stored in the buffer memory, while being divided into files in response to the division timing signal from the division managing means.

It is preferable that the division managing means generates the division timing signal at a predetermined time interval or at each of preset time instants. It is also preferable that the division managing means generates the division timing signal when a predetermined change in environmental condition has occurred or when a predetermined signal is received from the outside. It is further preferable that the division managing means comprises an artificial intelligence fuzzy-judgment means which generates the division timing signal based on an automatic judgment.

The recording apparatus of the above structure may further comprise a manual input means for inputting a division command for dividing the digital data at an arbitrary instant, wherein the control means preferably performs the control of dividing the digital data into files in response to the division command from the manual input means or the division timing signal from the division managing means.

In the recording apparatus of the above structure, such a control is carried out that the digital data continuously received and stored in the buffer memory is stored in the storage means at a writing speed higher than the speed at which the data was stored in the buffer memory, while being divided into files in response to the division timing signals from the division managing means.

Thus, by virtue of the above control for storing the digital data into the storage means at a speed higher than the speed for storing into the buffer memory while dividing into files in response to the division timing signals, no missing part will occur in the recording even when a continuous signal is received. More specifically, although a certain amount of time is needed for the file closing and file opening processing to stop recording the directly preceding file and to start recording the current file at the position to be searched for, since the total time period necessary for closing the file, opening the file and writing the digital data may be shorter than the time period necessary for receiving the digital data, no problem will arise in performing a continuous recording.

In addition, in the recording apparatus with the above structure, not an index mark file system but a file division system is employed for searching for the top of a desired part of the recorded digital data, so that compatibility among different types of apparatuses is established. Furthermore, since there is no limit to the number of marks in the file division system, any desired number of search positions can be provided, whereas in the conventional system such as the index mark file system wherein the number of marks must be preset there is a limit to the number of search positions as its result, so that searches in excess of such number cannot be performed.

In this apparatus, the division timing signal for dividing the digital data at an arbitrary instant is generated by the division managing means, so that a division into files at an intended instant can be achieved without the need for the operator's skill. Consequently, the operator is released from the operations for creating files which the operator should have performed sitting in front of the apparatus all the time, and it will become possible to perform a division into files at an appropriate instant determined based on an objective judgment. In addition, by virtue of the automatic division into files by the division managing means it becomes possible to select the length between Nth division point and (N+1)th division point.

Consequently, it is possible to realize such a recording apparatus which can provide compatibility among different types of apparatuses and enables searches for an arbitrary number of arbitrary positions to be achieved while performing a continuous recording.

(3) A third invention is a reproducing apparatus for reproducing digital data stored in a file format which is characterized by comprising a storage means for storing the digital data as a plurality of files; a buffer memory for temporarily storing the digital data read from the storage means; and a control means for performing a control to cause the digital data stored in the storage means in the form of a plurality of files to be temporarily stored in the buffer memory in order to allow the digital data to be outputted therefrom to the outside at a predetermined speed; wherein the control means carries out the control in such a manner that the digital data is read from the storage means into the buffer memory at a reading speed which is higher than a speed at which the digital data is outputted from the buffer memory to the outside to thereby allow the plurality of files of digital data stored in the storage means to be outputted to the outside as digital data in a continuous format.

In the reproducing apparatus of the above structure according to the invention, such a control is performed that the digital data is read from the storage means into the buffer memory at a reading speed which is higher than the speed at which the data is outputted from the buffer memory to the outside to thereby allow the plurality of files of digital data stored in the storage means to be outputted to the outside as digital data in a continuous form.

Thus, the digital data is read from the storage means into the buffer memory at the reading speed which is higher than the speed at which the data is outputted from the buffer memory to the outside, so that no interruption of reproduction will occur at the time of transition to the next file even when a plurality of files are successively reproduced. More specifically, although a certain time is needed for the file closing and file opening processing to stop reproducing the directly preceding file and to start reproducing the current file at the position to be searched for, no problem will arise in carrying out continuous reproduction, since the total time period necessary for closing the file, opening the file and reading the digital data is shorter that the time period necessary for outputting the reproduced signal.

In addition, in the reproducing apparatus with the above structure, not an index mark file system but a file division system is employed for searching for the top of a desired part of the recorded digital data, so that compatibility among different types of apparatuses is established. Furthermore, since there is no limit to the number of marks in the file division system, any desired number of search positions can be provided, whereas in the conventional system such as the index mark file system wherein the number of marks must be preset there is a limit to the number of search positions as its result, so that searches in excess of such number is not possible.

Thus, it becomes possible to realize such a reproducing apparatus which can provide compatibility among different types of apparatuses, can achieve any arbitrary number of searches for any arbitrary positions and can reproduce a plurality of files in a continuous manner.

(4) A fourth invention is a recording/reproducing apparatus for recording a received signal as digital data in a file format and for reproducing the digital data stored in the file format which is characterized by comprising a storage means for storing the digital data as a plurality of files; a buffer memory for temporarily storing the received signal as digital data in a recording mode and for temporarily storing the digital data read from the storage means in a reproducing mode; a manual input means for inputting a division command for dividing the digital data at an arbitrary instant in the recording mode; and a control means for performing a first control to cause the digital data temporarily stored in the buffer memory to be stored in the storage means as files in the recording mode and for performing a second control to cause the digital data stored in the storage means in the form of a plurality of files to be temporarily stored in the buffer memory in order to allow the digital data to be outputted therefrom to the outside at a predetermined speed in the reproducing mode; wherein the control means carries out the first control in the recording mode in such a manner that the digital data continuously received and stored in the buffer memory is stored in the storage means at a writing speed which is higher than a speed at which the digital data was stored in the buffer memory, while being divided into files in response to the division command from the manual input means, the control means further carrying out the second control in the reproducing mode in such a manner that the digital data is read from the storage means into the buffer memory at a reading speed which is higher than a speed at which the digital data is outputted from the buffer memory to the outside to thereby allow the plurality of files of digital data stored in the storage means to be outputted to the outside as digital data in a continuous format.

In the recording/reproducing apparatus of the above structure according to the invention, such a control is performed that the digital data continuously received and stored in the buffer memory is stored in the storage means at a writing speed, which is higher than the speed at which the digital data was stored in the buffer memory, while being divided into files in response to the division command signals from the manual input means. In the recording/reproducing apparatus of the above structure according to the invention, such a control is further performed that the digital data is read from the storage means into the buffer memory at a reading speed which is higher than the speed at which the data is outputted from the buffer memory to the outside to thereby allow the plurality of files of digital data stored in the storage means to be outputted to the outside as digital data in a continuous form.

Thus, the control is made such that the digital data is stored in the storage means at the writing speed higher than the speed during its storage in the buffer memory wherein the digital data is divided into files at each instant of division commands, so that no missing part will occur in the recording even when a continuous signal is being received. More specifically, although a certain amount of time is needed for the file closing and file opening processing to stop recording the directly preceding file and to start recording the current file at the position to be searched for, since the total time period necessary for closing the file, opening the file and writing the digital data may be shorter than the time period necessary for receiving the digital data, no problem will arise in performing a continuous recording.

On the other hand, the digital data is read from the storage means into the buffer memory at a reading speed which is higher than the speed at which the data is outputted from the buffer memory to the outside, so that no interruption of reproduction will occur at the time of transition to the next file even when a plurality of files are successively reproduced. More specifically, although a certain amount of time is needed for the file closing and file opening processing to stop reproducing the directly preceding file and to start reproducing the current file at the position to be searched for, since the total time period necessary for closing the file, opening the file and reading the digital data may be shorter than the time period necessary for outputting the digital data, no problem will arise in performing continuous reproduction.

In addition, in the recording/reproducing apparatus with the above structure, not an index mark file system but a file division system is employed for searching for the top of a desired part of the recorded digital data, so that compatibility among different types of apparatuses is established. Furthermore, since there is no limit to the number of marks in the file division system, any desired number of search positions can be provided, whereas in the conventional system such as the index mark file system wherein the number of marks must be preset there is a limit to the number of search positions as its result, so that searches in excess of such number is not possible.

Thus, it becomes possible to provide a recording/reproducing apparatus which can provide compatibility among different types of apparatuses, enables an arbitrary number of arbitrary positions to be searched for while carrying out continuous recording, and can reproduce a plurality of files in a continuous manner.

(5) A fifth invention is a recording/reproducing apparatus for recording a received signal as digital data in a file format and for reproducing the digital data stored in the file format which is characterized by comprising a storage means for storing the digital data as a plurality of files; a buffer memory for temporarily storing the received signal as digital data in a recording mode and for temporarily storing the digital data read from the storage means in a reproducing mode; a division managing means for generating a division timing signal for dividing the digital data at an arbitrary instant; and a control means for performing a first control to cause the digital data temporarily stored in the buffer memory to be stored in the storage means as files in the recording mode and for performing a second control to cause the digital data stored in the storage means in the form of a plurality of files to be temporarily stored in the buffer memory in order to allow the digital data to be outputted therefrom to the outside at a predetermined speed in the reproducing mode; wherein the control means carries out the first control in the recording mode in such a manner that the digital data continuously received and stored in the buffer memory is stored in the storage means at a writing speed which is higher than a speed at which the digital data was stored in the buffer memory, while being divided into files in response to the division timing signal from the division managing means, the control means further carrying out the second control in the reproducing mode in such a manner that the digital data is read from the storage means into the buffer memory at a reading speed which is higher than a speed at which the digital data is outputted from the buffer memory to the outside to thereby allow the plurality of files of digital data stored in the storage means to be outputted to the outside as digital data in a continuous format.

It is preferable that the division managing means generates the division timing signal at a predetermined time interval or at each of preset time instants. It is also preferable that the division managing means generates the division timing signal when a predetermined change in environmental condition has occurred or when a predetermined signal is received from the outside. It is further preferable that the division managing means comprises an artificial intelligence fuzzy-judgment means which generates the division timing signal based on an automatic judgment.

The recording/reproducing apparatus of the above structure may further comprise a manual input means for inputting a division command for dividing the digital data at an arbitrary instant, wherein the control means preferably performs the control of dividing the digital data into files in response to the division command from the manual input means or the division timing signal from the division managing means.

In the recording/reproducing apparatus of the above structure, such a control is carried out that the digital data continuously received and stored in the buffer memory is stored in the storage means at a writing speed higher than the speed at which the data was stored in the buffer memory, while being divided into files in response to the division timing signals from the division managing means. Also, such a control is performed that the digital data is read from the storage means into the buffer memory at a reading speed which is higher than the speed at which the data is outputted from the buffer memory to the outside to thereby allow the plurality of files of digital data stored in the storage means to be outputted to the outside as digital data in a continuous format.

Thus, by virtue of the above control for storing the digital data into the storage means at a speed higher than the speed for storing into the buffer memory while dividing into files in response to the division timing signals, no missing part will occur in the recording even when a continuous signal is received. More specifically, although a certain amount of time is needed for the file closing and file opening processing to stop recording the directly preceding file and to start recording the current file at the position to be searched for, since the total time period necessary for closing the file, opening the file and writing the digital data may be shorter than the time period necessary for receiving the digital data, no problem will arise in performing continuous recording.

On the other hand, the digital data is read from the storage means into the buffer memory at a reading speed which is higher than the speed at which the data is outputted from the buffer memory to the outside, so that no interruption of reproduction will occur at the time of transition to the next file even when a plurality of files are successively reproduced. More specifically, although a certain amount of time is needed for the file closing and file opening processing to stop reproducing the directly preceding file and to start reproducing the current file at the position to be searched for, since the total time period necessary for closing the file, opening the file and reading the digital data may be shorter than the time period necessary for outputting the digital data, no problem will arise in performing continuous reproduction.

In addition, in the recording/reproducing apparatus with the above structure, not an index mark file system but a file division system is employed for searching for the top of a desired part of the recorded digital data, so that compatibility among different types of apparatuses is established. Furthermore, since there is no limit to the number of marks in the file division system, any desired number of search positions can be provided, whereas in the conventional system such as the index mark file system wherein the number of marks must be preset there is a limit to the number of search positions as its result, so that searches in excess of such number is not possible.

In this apparatus, the division timing signal for dividing the digital data at an arbitrary instant is generated by the division managing means, so that a division into files at an intended instant can be achieved without the need for the operator's skill. Consequently, the operator is released from the operations for creating files which the operator should have performed sitting in front of the apparatus all the time, and it will become possible to perform a division into files at an appropriate instant determined based on an objective judgment. In addition, by virtue of the automatic division into files by the division managing means it becomes possible to select the length between Nth division point and (N+1)th division point.

Consequently, it is possible to realize such a recording/reproducing apparatus which can provide compatibility among different types of apparatuses, enables any arbitrary number of searches for arbitrary positions to be achieved while performing a continuous recording, and can reproduce a plurality of files in a continuous manner.

DESCRIPTION OF THE PREFERRED EMBODIMENTS OF THE INVENTION

A recording apparatus, a reproducing apparatus and a recording/reproducing apparatus according to embodiments of the invention will now be described with reference to the accompanying drawings. It is noted, however, that the present invention should not be limited to those embodiments.

Figure 1:
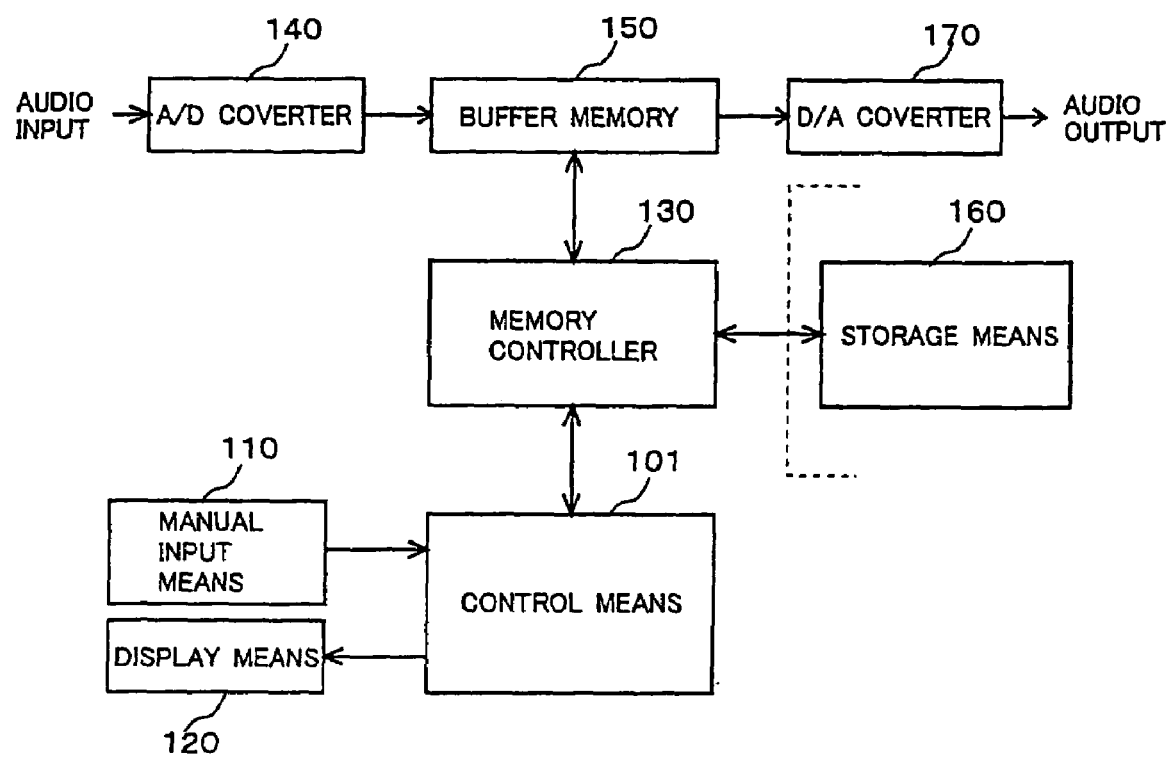
FIG. 1 is a functional block diagram showing the structure of a recording apparatus, a reproducing apparatus and a recording/reproducing apparatus according to an embodiment of the invention.

(I) Structure of Recording Apparatus, Reproducing Apparatus and Recording/Reproducing Apparatus FIG. 1 is a block diagram showing the structure of a recording/reproducing apparatus 100 which can perform both recording and reproducing operations. Therefore, those portions of the recording/reproducing apparatus 100 which relate to the recording operation constitute a recording apparatus. Likewise, those portions of the recording/reproducing apparatus 100 which relate to the reproducing operation constitute a reproducing apparatus.

In FIG. 1, shown at 101 is a control means, as a system controller, for controlling the entire operation of the recording/reproducing apparatus 100. The control means 101 carries out such a control in the recording mode that digital data which has been continuously received and stored in a buffer memory is stored in a storage means with a writing speed, which is higher than the speed at which the digital data has been stored in the buffer memory, while being divided into files in response to a division command from a manual input means.

Show at 110 is the manual input means at which various input operations are performed. In addition to commands of recording and reproduction, a division command for dividing the digital data at an arbitrary instant can be input at this manual input means. A display means 120 displays various statuses of the recording/reproducing apparatus 100. When an operation is made at the manual input means 110 for input, various statuses such as the necessary file number are displayed on the display means 120.

A memory controller 130 performs various controls such as writing and reading controls when writing into and/or reading from the buffer memory and the storage means which will be described later. An A/D converter 140 converts an input analog signal into digital data.

The buffer memory 150 temporarily stores the digital data when receiving from and outputting to the outside. This buffer memory 150 is provided for the temporary storage when recording into the storage means and reproducing from such storage means. The storage means 160 stores the digital data in the form of files. This storage means 160 may be a built-in type which is fixedly mounted in the recording/reproducing apparatus 100 or a removable type which is detachably mounted on the recording/reproducing apparatus 100.. The storage means 160 can take the form of a semiconductor memory, a hard disc drive or an optical disc drive.

At the storage means 160, a control is performed by the memory controller 130 to store data at a writing speed which is higher than the speed at which the data is inputted to the buffer memory 150. Similarly, at the storage means 160 a control is performed by the memory controller 130 to reproduce data at a reading speed which is higher than the speed at which the data is outputted from the buffer memory 150.

A D/A converter 170 converts the digital data to be outputted into an analog audio signal and outputs it to the outside.

Although an embodiment of the recording/reproducing apparatus capable of both recording and reproducing is shown in FIG. 1, a recording apparatus which does not comprise the D/A converter 170 and a reproducing apparatus which does not comprise the A/D converter 140 also constitute embodiments of the present invention.

(II) Operation of Recording/Reproducing Apparatus and Recording Apparatus

When a command of starting recording is received from the manual input means 110, the control means 101 instructs various portions of the apparatus to perform a recording operation. When an audio signal such as a microphone input signal and a line-input signal is received from a not-shown input terminal, the A/D converter 140 converts the audio signal into digital data at a predetermined sampling frequency with a predetermined number of quantization bits. As a result, digital data of a sampling frequency of 44.1 kHz, sixteen quantization bits and two channels is generated, for example. This digital data is stored in the buffer memory 150 (see FIG. 2 at (a) and (b)).

The digital data thus temporarily stored in the buffer memory 150 is then written into the storage means 160 in the form of files in synchronism with the operation timing of the storage means 160.. In this case, in order to manage to acquire time necessary for opening or closing a file, the memory controller 130 carries out such a control that the digital data stored in the buffer memory 150 is read therefrom at a speed higher than the speed at which the data was stored therein and then written into the storage means 160 (see FIG. 2 at (b), (c) and (d)).

When a division command is received from the manual input means 110 while the audio signal is being received, the control means 101 detects this and sends an instruction of division of recording to the memory controller 130. In response to this, the memory controller 130 interrupts the writing of a file N from the buffer memory 150 into the storage means 160 when that portion of the digital data which corresponds to the instant of the division command has been written, and closes the file N which has been being written into the storage means 160 (see FIG. 2 at (d)).

When the closing of the file N has been completed, the memory controller 130 opens a file N+1 within the storage means 160. Then, the memory controller 130 starts writing the digital data from immediately after the command of division of recording at the manual input means 110 as the file N+1.

In a similar manner, when a division command is again received from the manual input means 110 while the audio signal is being received, the control means 101 detects this and sends a command of division of recording to the memory controller 130. In response to this, the memory controller 130 interrupts the writing of the file N+1 from the buffer memory 150 into the storage means 160 when that portion of the digital data which corresponds to the instant of the division command has been written, and closes the file N+1 which has been being written into the storage means 160 (see FIG. 2 at (d)).

When the closing of the file N+1 has been completed, the memory controller 130 opens a file N+2 within the storage means 160. Then, the memory controller 130 starts writing the digital data from immediately after the command of division of recording at the manual input means 110 as the file N+2.

In this manner, under the control of the control means 101 and the memory controller 130, the digital data is written in such a manner that each time a division command is received a new file whose start position coincides with the instant of division command is created.

In the above case, it may be preferable from the view point of file management that a plurality of files for dividedly recording the continuous audio signal be stored in the storage means 160 by creating in a single directory thereof files having respective file names representing serial numbers under the control of the control means 101 and the memory controller 130. In this case, it may also be preferable that information about the file names, file sizes and the like be written in an area called a "directory entry" under the control of the control means 101 and the memory controller 130. This kind of processing is carried out in parallel with the above-described file closing and other operations. Such processing can also be done in a spare time since the digital data stored in the buffer memory 150 is read therefrom and written into the storage means 160 at a speed higher than the speed during its storage in the buffer memory.

Figure 3:
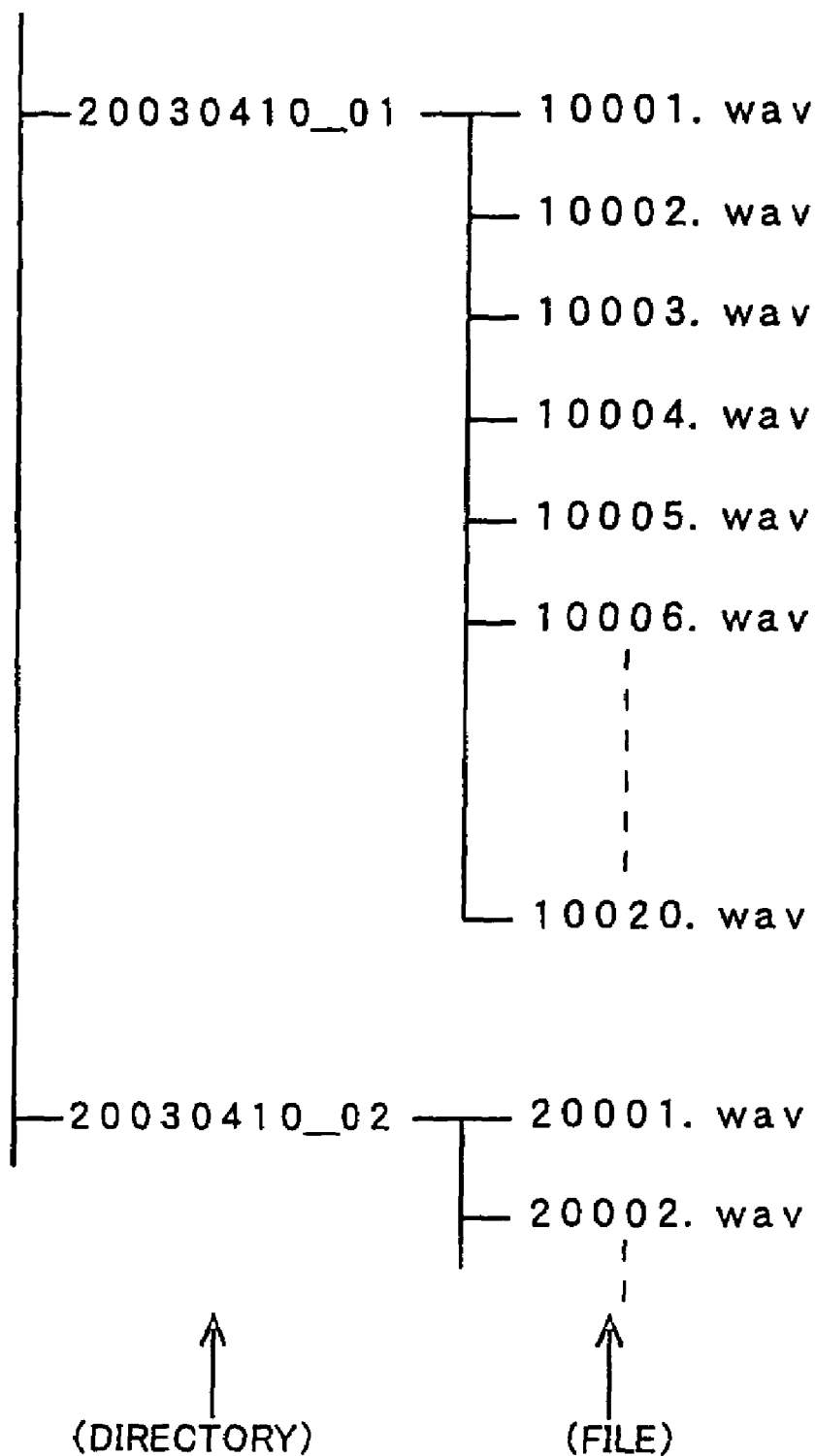
FIG. 3 is an illustration showing the way of recording by the recording apparatus or the recording/reproducing apparatus according to the embodiment of the invention.

In an example of FIG. 3, there is shown a situation where twenty files 10001.wav to 10020.wav have been stored in a directory 20030410_01 while several files 20001.wav, . . . have been stored in another directory 20030410_02. Each suffix "wav" in the above description and the figure represents the corresponding file being audio data in the wave format.

In the above case, it may be preferable that each directory be represented by a name (year, month and day) or a current time and that the names of files represent serial numbers in the corresponding directory from a managing point of view. However, the arrangement of directories and files is not restricted to such example.

As described above, the control is made such that the digital data is stored in the storage means 160 at a writing speed higher than the speed during its storage in the buffer memory 150 wherein the digital data is divided into files at each instant of division command, so that no missing part will occur in the recording even when a continuous signal is being received. More specifically, although a certain amount of time is needed for the file closing and file opening processing to stop recording the directly preceding file and to start recording the current file at the position to be searched for, no problem will arise in carrying out the continuous recording, since the total time period necessary for closing the file, opening the file and writing the digital data is shorter that the time period necessary for receiving the digital data.

In addition, since a file division system is employed for a position search in lieu of the index mark file system, compatibility among different types of apparatuses is established. Furthermore, since the file division system is employed in this apparatus, any desired number of search positions can be provided, whereas in the conventional system such as the index mark file system wherein the number of marks must be preset there is a limit to the number of search positions as its result. Thus, it becomes possible to provide a recording apparatus in which compatibility among different types of apparatuses is achieved and an arbitrary number of arbitrary positions can be searched for while carrying out a continuous recording.

Figure 4:
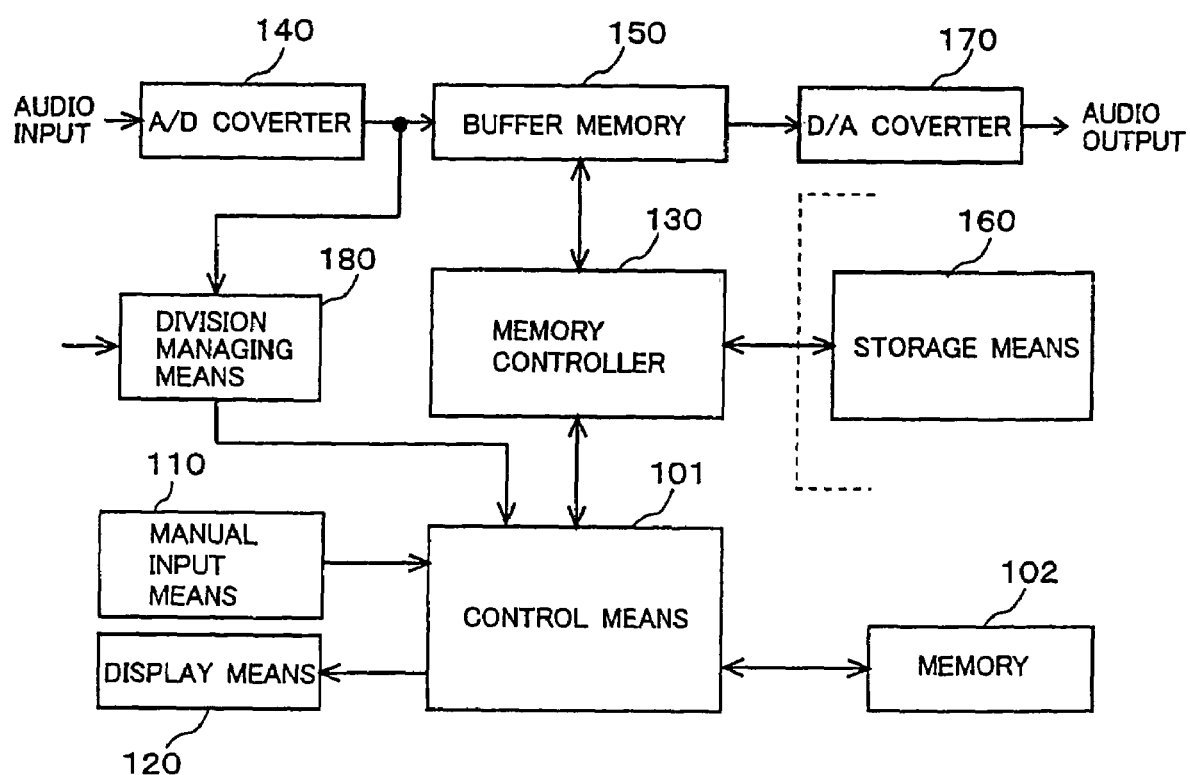
FIG. 4 is a functional block diagram showing the structure of a recording apparatus and a recording/reproducing apparatus according to another embodiment of the invention.

(III) Another Structure of Recording Apparatus, Reproducing Apparatus and Recording/Reproducing Apparatus FIG. 4 is a block diagram showing the structure of another recording/reproducing apparatus 100 which can perform both recording and reproducing operations. In this case, those portions of the recording/reproducing apparatus 100 which relate to the recording operation constitute a recording apparatus. Likewise, those portions of the recording/reproducing apparatus 100 which relate to the reproducing operation constitute a reproducing apparatus. The same constituent elements of this apparatus 100 as those shown in FIG. 1 are designated by the same reference numerals and their repeated description will be omitted.

A control means 101 carries out such a control in the recording mode that digital data which has been continuously received and stored in a buffer memory is stored in a storage means at a writing speed, which is higher than the speed at which the digital data has been stored in the buffer memory, while being divided into files in response to a division timing signal from a division managing means.

Also, the control means 101 carries out such a control in the reproducing mode that the digital data is read from the storage means into the buffer memory at a reading speed, which is higher than the speed at which the digital data is outputted from the buffer memory to the outside, wherein the digital data of a plurality of files stored in the storage means is outputted to the outside as digital data in a continuous form.

The control means 101 may also carry out such a control that the division into files is selectively performed either in response to a division command from a manual input means or in response to the division timing signal from the division managing means which will be described later.

Shown at 102 is a memory for storing a variety of information such as predetermined time interval data, preset time instant data and predetermined conditions about environmental changes which are required when the division managing means (described later) generates the division timing signal. The memory 102 may be a built-in memory of a CPU which constitutes the control means 101.

The division managing means 180 generates the division timing signal for dividing the digital data at an arbitrary instant when it is recorded. In this case, it is preferable that the division managing means 180 generate such division timing signal with reference to the information of the predetermined time interval or the preset time instants as stored in the memory 102. It is also preferable that the division managing means 180 refer to information about the predetermined condition of environmental change as stored in the memory 102 and generate the division timing signal when the environmental change has occurred. It is further preferable that the division managing means 180 generate such division timing signal when a predetermined signal is received from the outside of this apparatus. In addition, the division managing means 180 preferably comprises an artificial intelligence fuzzy-judgment means (not shown) which generates the division timing signal based on an automatic judgment.

(IV) Recording Operation of Recording/Reproducing Apparatus and Recording Apparatus When a command of starting recording is received from the manual input means 110, the control means 101 instructs various portions of the apparatus to perform a recording operation. When an audio signal such as a microphone input signal and a line-input signal is received from a not-shown input terminal, an A/D converter 140 converts the audio signal into digital data at a predetermined sampling frequency with a predetermined number of quantization bits. As a result, digital data of a sampling frequency of 44.1 kHz, sixteen quantization bits and two channels is generated, for example. This digital data is stored in the buffer memory 150 (see FIG. 2 at (a) and (b)).

The digital data thus temporarily stored in the buffer memory 150 is then written into the storage means 160 in the form of files in synchronism with the operation timing of the storage means 160. In this case, in order to acquire time necessary for opening or closing a file, the memory controller 130 carries out such a control that the digital data stored in the buffer memory 150 is read at a reading speed higher than the writing speed at which the data was stored therein and then written into the storage means 160 (see FIG. 2 at (b), (c) and (d)).

The division managing means 180 carries out processing for the division into files and, when a predetermined condition is met, generates the division timing signal for dividing the digital data at an arbitrary instant, which signal is then transmitted to the control means 101.

Figure 5:
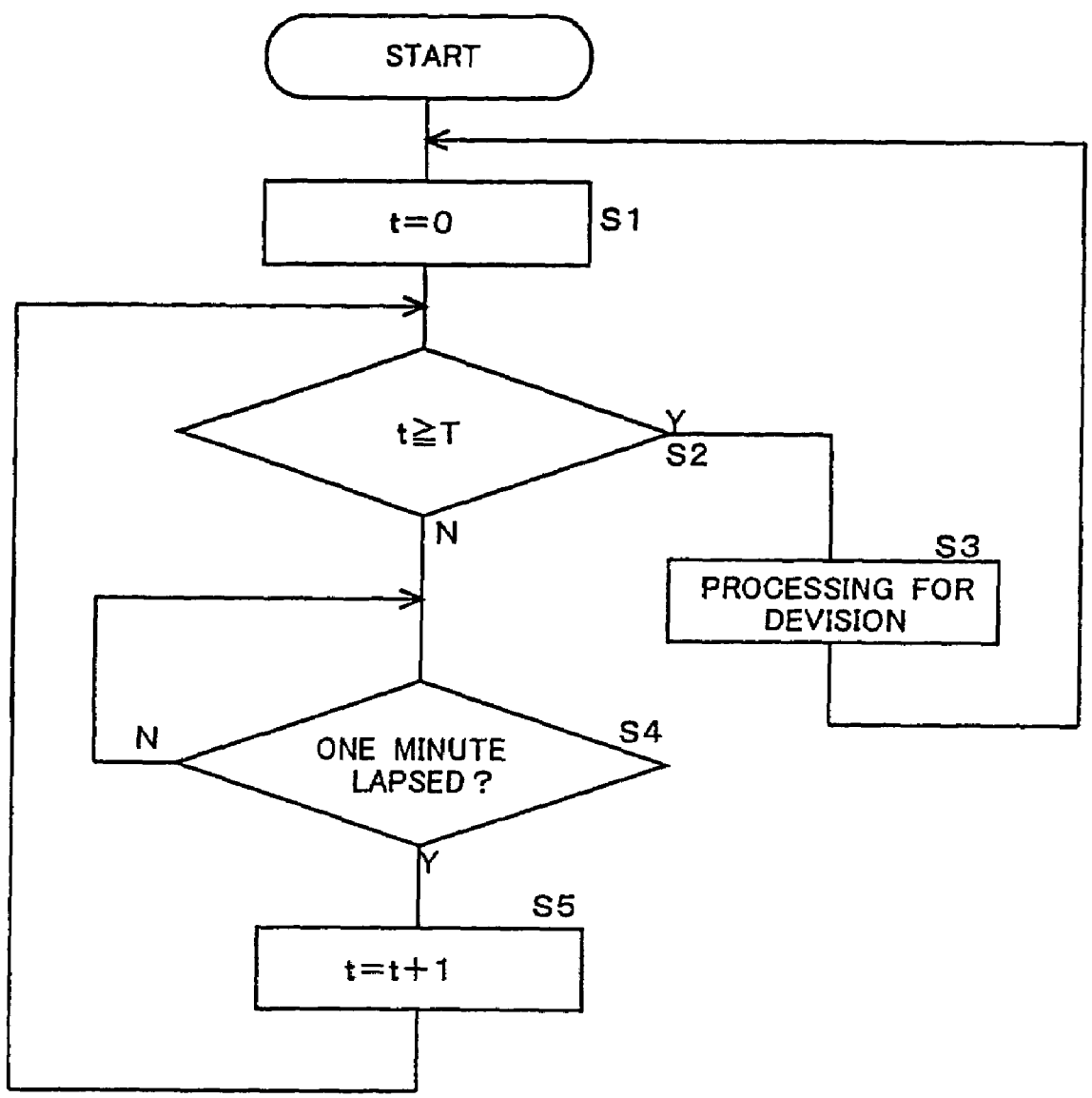
FIG. 5 is a flowchart explaining the operation of the recording apparatus or the recording/reproducing apparatus according to the embodiment of the invention.

FIG. 5 shows an example of processing in which the dividing timing signal is generated so that the division into files is performed at a predetermined time interval T. In this case, the time interval T has been stored in the memory 102 and the control means 101 reads the time interval and supplies it to the division managing means 180 when necessary.

The division managing means 180 starts the processing by initializing a lapsed processing time t to zero (step S1 of FIG. 5). The division managing means 180 then compares t with T to determine whether or not the lapsed processing time t has reached the predetermined time interval T (step S2 of FIG. 5).

If the lapsed processing time t has not reached the time interval T ("N" at step S2), the division managing means waits until one minute lapses (step S4) and increments t (step S5) at the time when one minutes has lapsed ("Y" at step S4). The processing then returns to the comparison of t with T (step S2).

If the lapsed processing time t has reached the time interval T ("Y" at step S2), the division managing means generates the division timing signal and supplies it to the control means 101 (step S3). In response to this division timing signal, the control means 101 gives the memory controller 130 an instruction of division of recording.

Figure 2:
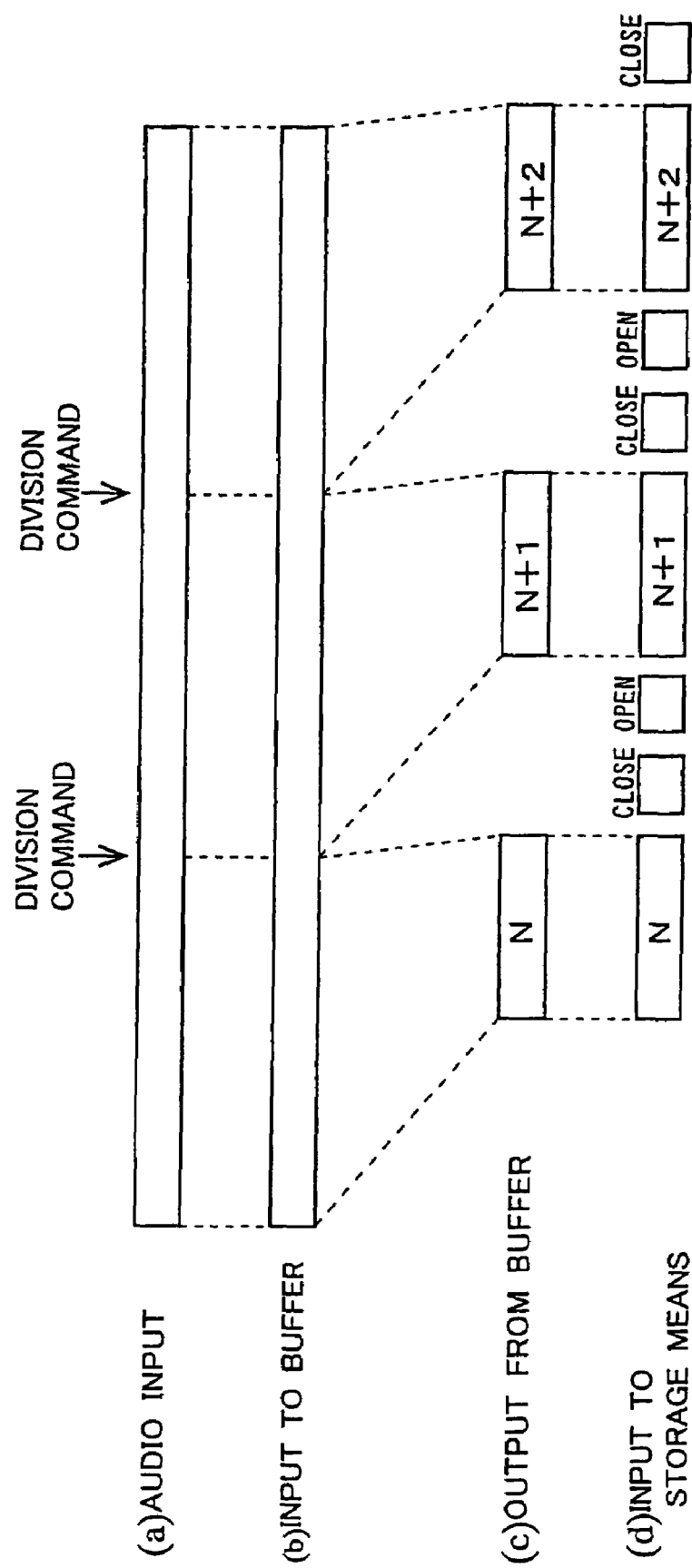
FIG. 2 is a time chart explaining the operation of the recording apparatus or the recording/reproducing apparatus according to the embodiment of the invention.

In response to this, the memory controller 130 interrupts the writing of a file N from the buffer memory 150 into the storage means 160 when that portion of the digital data which corresponds to the instant of the division timing signal has been written, and closes the file N which has been being written into the storage means 160 (see FIG. 2 at (d)).

When the closing of the file N has been completed, the memory controller 130 opens a file N+1 within the storage means 160. Then, the memory controller 130 starts writing the digital data from immediately after the division timing signal from the division managing means 180 as the file N+1.

In a similar manner, when another division timing signal is again supplied from the division managing means 180 while the audio signal is being received, the control means 101 detects this and sends another instruction of division of recording to the memory controller 130. In response to this, the memory controller 130 interrupts the writing of the file N+1 from the buffer memory 150 into the storage means 160 when that portion of the digital data which corresponds to the instant of the division timing signal has been written, and closes the file N+1 which has been-being written into the storage means 160 (see FIG. 2 at (d)).

When the closing of the file N+1 has been completed, the memory controller 130 opens a file N+2 within the storage means 160. Then, the memory controller 130 starts writing the digital data from immediately after the division timing signal from the division managing means 180 as the file N+2.

In this manner, under the control of the control means 101 and the memory controller 130, the digital data is written in such a manner that each time the division timing signal is received a new file whose start position coincides with the instant of the division timing signal is created.

In the above case, it may be preferable from the view point of file management that a plurality of files for dividedly recording the continuous audio signal be written into the storage means 160 by creating in a single directory thereof files having respective file names representing serial numbers under the control of the control means 101 and the memory controller 130. In this case, it may also be preferable that information about the file names, file sizes and the like be written in an area called a "directory entry" under the control of the control means 101 and the memory controller 130. This kind of processing is carried out in parallel with the above-described file closing and other operations. Such processing can also be done in a spare time since the digital data stored in the buffer memory 150 is read therefrom and written into the storage means 160 at a speed higher than the speed during its storage into the buffer memory.

Figure 6:
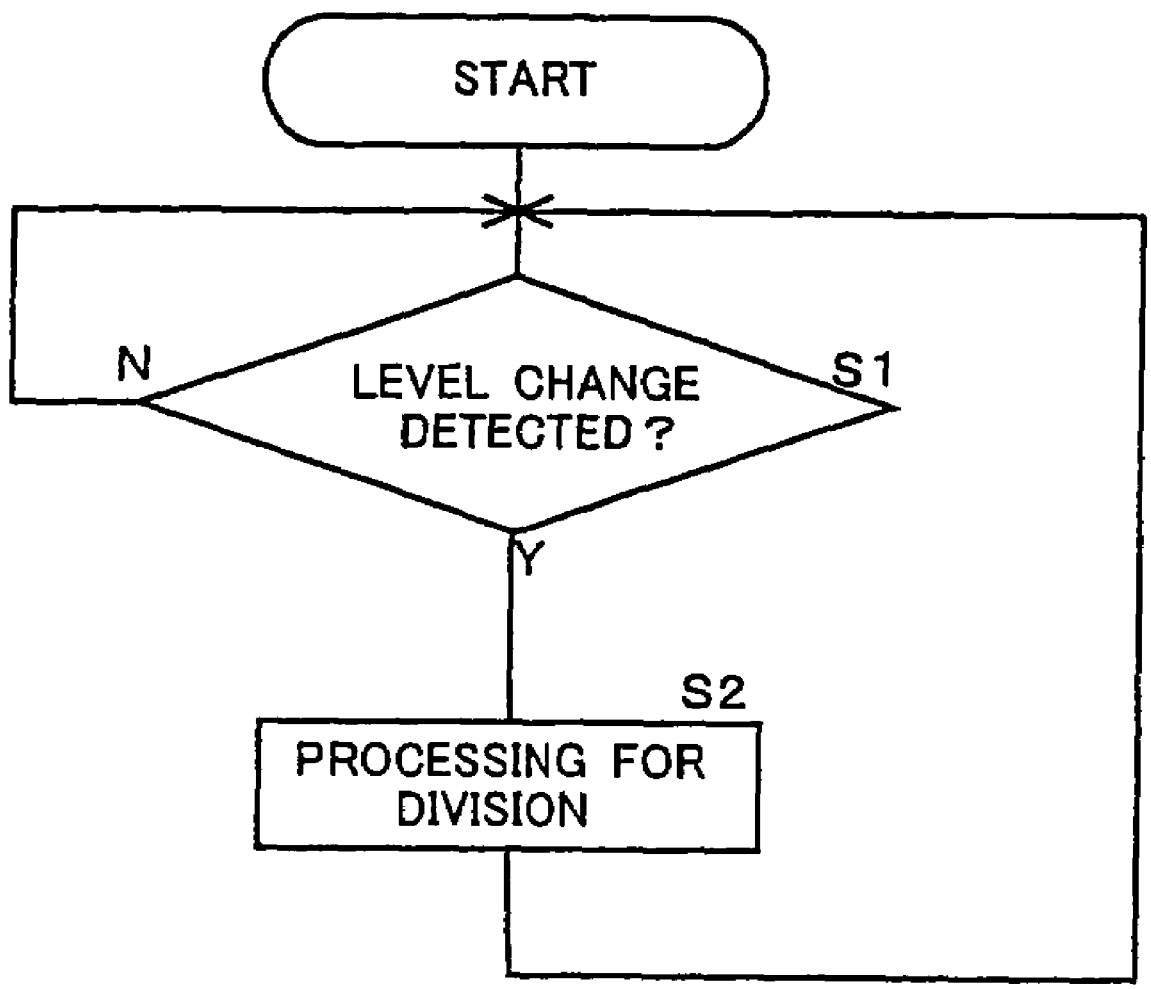
FIG. 6 is another flowchart explaining the operation of the recording apparatus or the recording/reproducing apparatus according to the embodiment of the invention.

The division managing means 180 may be arranged such that it monitors any change in output level of the A/D converter 140 (step S1 of FIG. 6) and generates the division timing signal (step S2 of FIG. 6) when a change occurs in the level of the audio signal ("Y" at step S1). By such an arrangement, it becomes possible to generate the division timing signal immediately at an appropriate timing. It may also be possible to arrange the division managing means 180 so as to directly monitor not only the change in level of the audio signal from the A/D converter 140 but also a change in motion, color and/or spatial frequency components of a video signal in order to generate the division timing signal. Also, the division managing means 180 may be arranged such that, when a predetermined signal (a signal from a sensor or the like, for example) is received from the outside, it generates the division timing signal at the instant when such predetermined signal is received.

Figure 7:
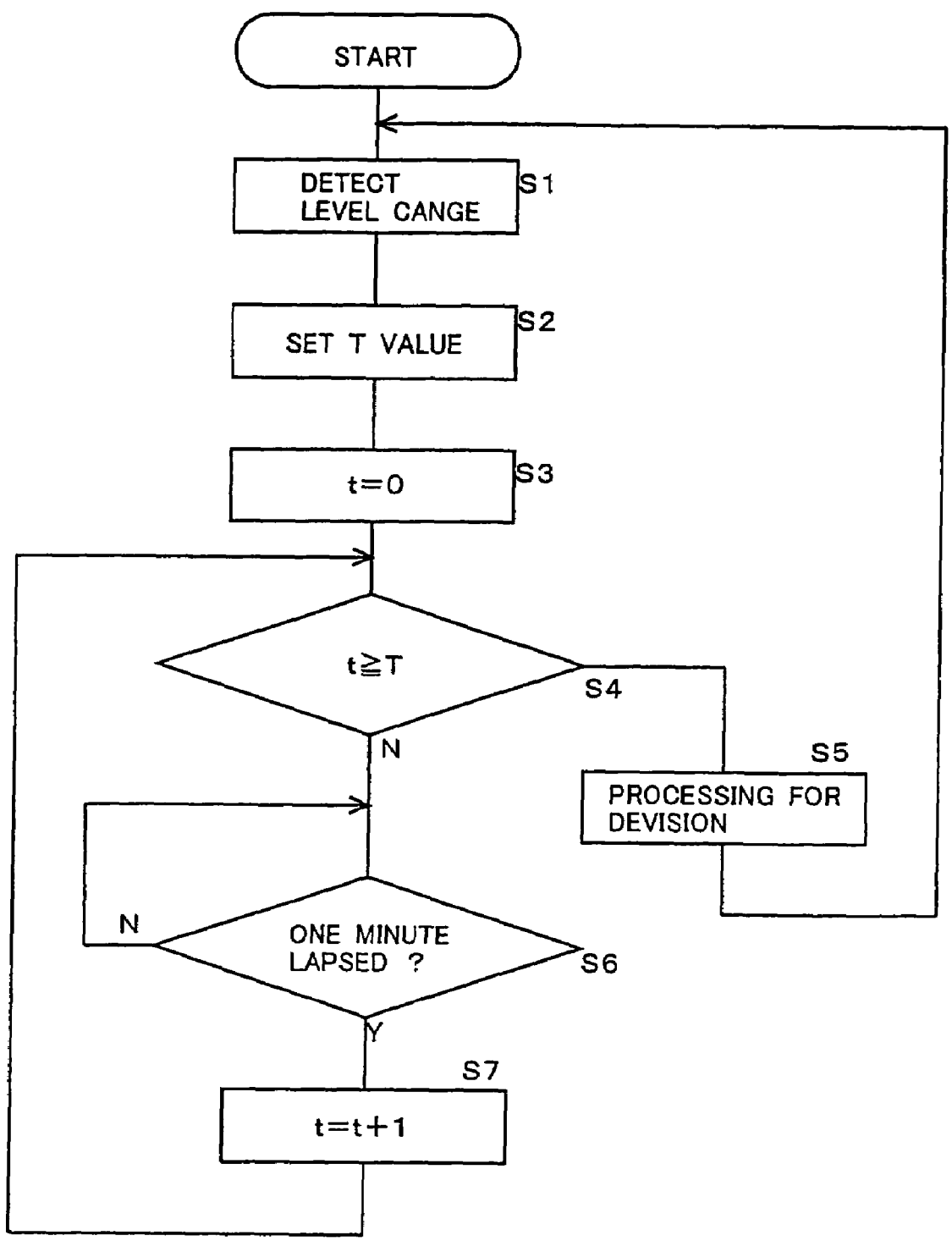
FIG. 7 is another flowchart explaining the operation of the recording apparatus or the recording/reproducing apparatus according to the embodiment of the invention.

It is also possible to provide such processing in which the time interval T is set in accordance with a certain condition as shown in FIG. 7. The division managing means 180 detects a change in output level of the A/D converter 140 (step S1 of FIG. 7) and sets T (i.e., the time interval at which a division of file is performed (the frequency of division)) in accordance with the level change (the change in environmental condition) of the audio signal (step S2 of FIG. 7). For example, when the level change is large it is considered that the change in the condition is also large, so that T is set to a small value to make a search in a later play mode easy to perform. On the other hand, when the level change is small it is considered that the change in the condition is also small, so that T is set large.

The processing is started with the lapsed processing time being initialized to zero (step S3). Then, a comparison of t with T is made to determine whether or not the lapsed processing time t reaches the time interval T which has been set in accordance with the level change (step S4). If the lapsed processing time t has not reached the time interval T determined in accordance with the level change ("N" at step S4), the division managing means waits until one minute lapses (step S6) and increments t (step S7) at the time when one minutes has lapsed ("Y" at step S6). The processing then returns to the comparison of t with T (step S4).

If the lapsed processing time t has reached the time interval T which has been set in accordance with the level change ("Y" at step S4), the division managing means generates the division timing signal for dividing into files and supplies it to the control means 101 (step S5). In response to this division timing signal, the control means 101 gives the memory controller 130 an instruction of division of recording.

Figure 8:
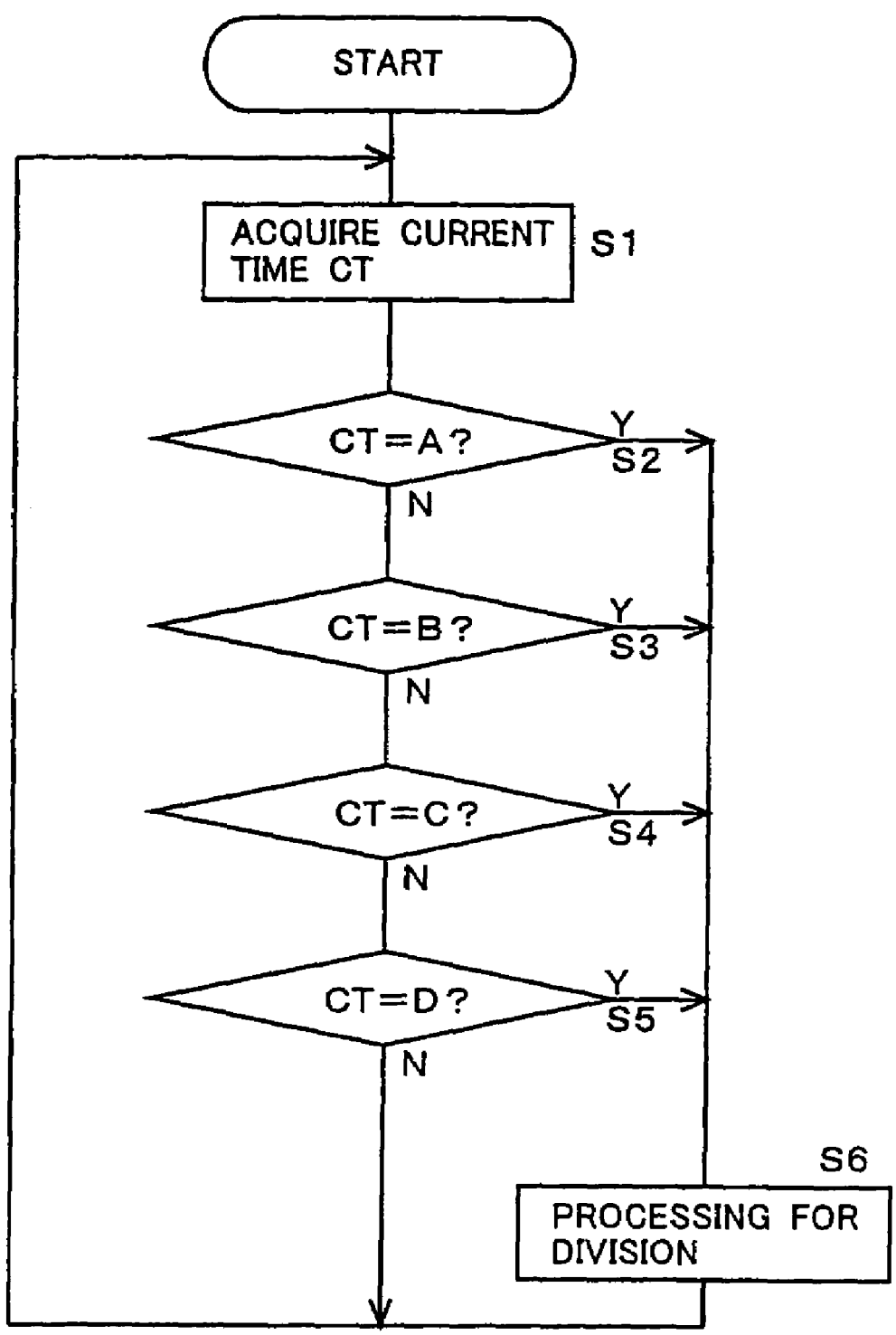
FIG. 8 is another flowchart explaining the operation of the recording apparatus or the recording/reproducing apparatus according to the embodiment of the invention.

It is also possible to provide processing in which a division into files is performed at preset time instants as shown in FIG. 8. First, the division managing means 180 acquires the current time CT (step S1 of FIG. 8). In this case, the division managing means 180 can acquire such time information from the clock portion (not shown) of the apparatus. On the other hand, the division managing means 180 reads a first preset time A to a fourth preset time D from the memory 102.

A comparison of CT with A is then made to determine whether the current time CT has reached the first preset time A stored in the memory 102 (step S2 of FIG. 8). If it has not yet reached the first preset time A stored in the memory 102 ("N" at step S2 of FIG. 8), another comparison is made between CT and B to determine whether the current time CT has reached the second preset time B stored in the memory 102 (step S3 of FIG. 8). If it has not yet reached the second preset time B stored in the memory 102 ("N" at step S3 of FIG. 8), a further comparison is made between CT and C to determine whether the current time CT has reached the third preset time C stored in the memory 102 (step S4 of FIG. 8). If it has not yet reached the third preset time C stored in the memory 102 ("N" at step S4 of FIG. 8), a still further comparison is made between CT and D to determine whether the current time CT has reached the fourth preset time D stored in the memory 102 (step S5 of FIG. 8).

If it is determined that the current time CT has reached any of the preset times as a result of the above comparisons, then the division timing signal is supplied to the control means 101 (step S6 of FIG. 8).

Thus, the recording/reproducing apparatus according to the embodiment of the present invention described above carries out such a control that the digital data continuously received and stored in the buffer memory 150 is stored in the storage means 160 at a writing speed higher than the speed at which the data was stored in the buffer memory 150, while being divided into files in response to the division timing signals from the division managing means 180.

By virtue of the above control for storing the digital data into the storage means at a speed higher than the speed of storing into the buffer memory while dividing into files in response to the division timing signals, no missing part will occur in the recording even when a continuous signal is received. More specifically, although a certain time is needed for the file closing and file opening processing to stop recording the directly preceding file and to start recording the current file at the position to be searched for, no problem will arise in carrying out the continuous recording, since the total time period necessary for closing the file, opening the file and writing the digital data is shorter that the time period necessary for receiving the digital data.

In addition, since a file division system is employed to carry out a search for a desired part of the recorded digital data in lieu of the index mark file system, compatibility among different types of apparatuses is established. Furthermore, since there is not limit to the number of search positions by the number of markers in the file division system, it is possible to provide search positions as many as necessary, whereas in the conventional system such as the index mark file system wherein the number of marks must be preset there is a limit to the number of search positions as its result, so that searches in excess of such number are not possible.

In the above-described apparatus, the division timing signal for dividing the digital data at an arbitrary instant is generated by the division managing means, so that a division into files at an intended instant can be achieved without the need for the operator's skill. Consequently, the operator is released from the operations for creating files which the operator should have performed sitting in front of the apparatus all the time, and it will become possible to perform a division into files at an appropriate instant determined based on an objective judgment.

In addition, by virtue of the automatic division into files by the division managing means it becomes possible to select a length between Nth division point and (N+1)th division point. Consequently, it is possible to realize such a recording/reproducing apparatus which can provide compatibility among different types of apparatuses and enables an arbitrary number of searches for any arbitrary positions to be achieved while performing a continuous recording.

In the above-described embodiment, it has bee described that the division of recording into files is performed in response to the division timing signal from the division managing means 180. However, it may also be possible to arrange so that such a division into files is performed each time a command is received from the manual input means 110. In this case, the control means 101 may carry out such a control that either of the division timing signal from the division managing means 180 or the command of division from the manual input means 110 is preferentially used. For carrying out such a control, it may be preferable to make it possible to determine which one has the preference through the manual input means 110. It may also be possible to previously store in the memory 102 preset information about which one has the preference.

In place of the division managing means 180, the control means 100 may perform the above-described processing performed by the division managing means 180. Furthermore, the division managing means 180 may be arranged to comprise an artificial intelligence fuzzy-judgment means (not shown) for generating the division timing signal based on an automatic judgment.

With the above arrangement, the control is made such that the digital data is stored into the storage means 160 at a speed higher than the speed of storing into the buffer memory 150 while dividing into files in response to the division timing signals, so that no missing part will occur in the recording even when a continuous signal is received. More specifically, although a certain time is needed for the file closing and file opening processing to stop recording the directly preceding file and to start recording the current file at the position to be searched for, no problem will arise in carrying out the continuous recording, since the total time period necessary for closing the file, opening the file and writing the digital data is shorter that the time period necessary for receiving the digital data.

In addition, since a file division system is employed in this recording apparatus to carry out a search in lieu of the index mark file system, compatibility among different types of apparatuses is established. Furthermore, since the file division system is employed in this recording apparatus, it is possible to provide search positions as many as necessary, whereas in the conventional system such as the index mark file system wherein the number of marks must be preset there is a limit to the number of search positions as its result.

Thus, it becomes possible to realize such a recording apparatus which can provide compatibility among different types of apparatuses and enables an arbitrary number of searches for any arbitrary positions to be achieved while performing a continuous recording.

(V) Reproducing Operation of Recording/Reproducing Apparatus and Reproducing Apparatus Hereinafter, a reproducing operation of the recording/reproducing apparatus and the reproducing apparatus will be described in relation to a successive reproduction of a plurality of files.

When a command of starting reproduction (starting continuous reproduction) is received from the manual input means 110 in the situation where the files of digital data have already been stored in the storage means 160, the control means 101 gives various portions of the apparatus instructions of reproducing operation. In this case, the file which is opened at the storage means 160 is a file having the entered file name when such file name has been entered at the manual input means 110 or a file having the lowest number (i.e., a file having the earliest record time) when no file name has been entered. The opened file is read from the storage means 160 and copied to the buffer memory 150 whereafter the file is closed (see FIG. 9 at (a)).

Figure 9:
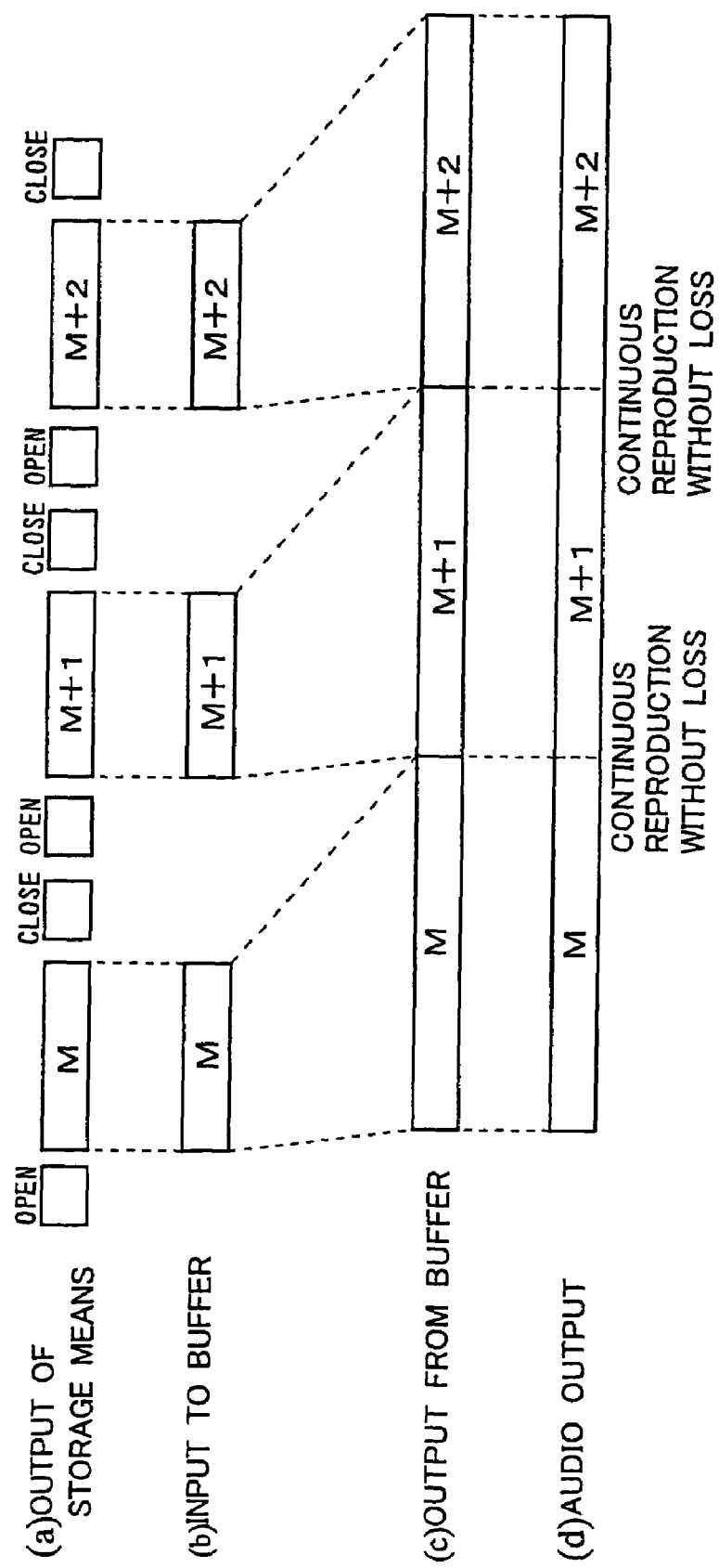
FIG. 9 is a time chart explaining the operation of the reproducing apparatus or the recording/reproducing apparatus according to the embodiment of the invention.

On the other hand, in order to make a continuous reproducing operation possible while managing to acquire time necessary to open and close files, the memory controller 130 performs such a control that the digital data stored in the storage means 160 is read therefrom and copied to the buffer memory 150 at a speed which is higher than the speed required to output the audio signal at the normal speed (see FIG. 9 at (a), (b) and (c)).

In the present example, the memory controller 130 opens a file M in the storage means 160, reads this file M and copies it to the buffer memory 150, and after that closes this file. The memory controller 130 then causes the file M now present in the buffer memory 150 to be supplied to the D/A converter 170 at the normal speed, whereby the audio signal is outputted from the D/A converter 170 at the normal speed which is the same as that at which the audio signal was recorded.

On the other hand, during the time when the file M is being outputted from the buffer memory 150, the memory controller 130 starts opening the next file M+1, reading it and copying it to the buffer memory 150. The memory controller 130 causes the file M+1 present in the buffer memory 150 to be supplied to the D/A converter 170 at the normal speed as soon as the output of the file M from the buffer memory 150 has completed. In this manner, a plurality of files stored in the storage means 160 are reproduced in a continuous manner without any missing part involved.

With the above arrangement, the digital data is read from the storage means 160 into the buffer memory 150 at a reading speed which is higher than the speed at which the data is outputted from the buffer memory 150 to the outside, so that no interruption of reproduction will occur at the time of transition to the next file even when a plurality of files are successively reproduced. More specifically, although a certain time is needed for the file closing and file opening processing to stop reproducing the directly preceding file and to start reproducing the current file at the position to be searched for, no problem will arise in carrying out the continuous reproduction, since the total time period necessary for closing the file, opening the file and reading the digital data is shorter that the time period necessary for outputting the reproduced signal.

In addition, since a file division system is employed in this reproducing apparatus to carry out a search in lieu of the index mark file system, compatibility among different types of apparatuses is established. Furthermore, since there is no relevant limit about the number of marks as in the index mark file system, reproduction can be started at any of search positions provided as many as necessary.

Thus, it becomes possible to realize such a recording/reproducing apparatus and a reproducing apparatus which can provide compatibility among different types of apparatuses, can achieve a search for any arbitrary position and can reproduce a plurality of files in a continuous manner.

In the above-described example, if a particular file name is first designated through the manual input means 110, the apparatus is brought into such a state that the beginning of the designated file has been searched for, whereafter the files are successively reproduced from that point. On the other hand, if a particular file name is designated through the manual input means 110 and a single reproduction is instructed, the beginning of the designated file is searched for and then only that file is reproduced.

In the above-describe embodiments, the audio signal is stored in the storage means 160 as digital data in the wave format. However, the data format should not be restricted to the wave format. The digital data can take other data formats and may also be in a compressed form.

The recording apparatus and the recording/reproducing apparatus according the above-described embodiments are applicable not only to an audio signal but also to a video signal, and similar effects can be obtained in both cases. Also, the recording apparatus, the reproducing apparatus and the recording/reproducing apparatus according the above-described embodiments are applicable not only to an audio signal but also to a video signal, and similar effects can be obtained in both cases.

Besides the examples in which an instant of the division is determined in the above-described manner, other examples can be taken such as a recording system for earthquake observation which comprises an earthquake sensor and in which an instant of the division is determined when a shock of a magnitude greater than a certain level as a preset condition of environmental change is sensed; a recording system for ecological observation, scene observation, sunshine observation or atmospheric observation which comprises color-related sensors such as a lightness sensor, a hue sensor and a saturation sensor and in which an instant of the division is determined when the brightness, hue or the like changes; a recording system with a pressure sensor in which the recording of a typhoon passing by is divided at appropriate instants based on the changes in atmospheric pressure; and a recording system with an odor sensor in which the recording of a fire broken out is appropriately divided.

As will be clear from the foregoing description of the embodiments of the invention, the following advantageous effects are attained according to the recording apparatus, reproducing apparatus and recording/reproducing apparatus of the present invention:

(1) In a recording apparatus according to the invention, such a control is performed in the recording mode that the digital data continuously received and stored in the buffer memory is stored in the storage means at a writing speed, which is higher than the speed at which the digital data has been stored in the buffer memory, while being divided into files in response to the division command from the manual input means.

Thus, the control is made such that the digital data is stored in the storage means at the writing speed higher than the speed during being stored in the buffer memory wherein the digital data is divided into files at each instant of division command, so that no missing part will occur in the recording even when a continuous signal is being received. Therefore, even when a certain time is needed for the file closing and file opening processing to stop recording the directly preceding file and to start recording the current file at the position to be searched for, no problem will arise.

In addition, since a file division system is employed for a position search in lieu of the index mark file system, compatibility among different types of apparatuses is established. Furthermore, since the limit of the number of marks in the index mark file system is now not relevant, any desired number of search positions can be provided. Thus, it becomes possible to provide a recording apparatus in which compatibility among different types of apparatuses is achieved and an arbitrary number of arbitrary search positions can be provided while carrying out continuous recording.

(2) In another recording apparatus according to the invention, such a control is carried out that the digital data continuously received and stored in the buffer memory is stored in the storage means at a writing speed higher than the speed at which the data was stored in the buffer memory, while being divided into files in response to the division timing signal from the division managing means.

By virtue of the above control for storing the digital data into the storage means at a speed higher than the speed of storing into the buffer memory while dividing into files in response to the division timing signals, no missing part will occur in the recording even when a continuous signal is received. Thus, even when a certain time is needed for the file closing and file opening processing to stop recording the directly preceding file and to start recording the current file at the position to be searched for, no problem will arise.

In addition, since a file division system is employed to carry out a search in lieu of the index mark file system, compatibility among different types of apparatuses is established. Furthermore, since there is not limit to the number of search positions by the number of markers in the file division system, it is possible to provide search positions as many as necessary.

In this apparatus, the division timing signal for dividing the digital data at an arbitrary instant is generated by the division managing means, so that a division into files at an intended instant can be achieved without the need for the operator's skill. Consequently, the operator is released from the operations for creating files which the operator should have performed sitting in front of the apparatus all the time, and it will become possible to perform a division into files at an appropriate instant determined based on an objective judgment. In addition, by virtue of the automatic division into files by the division managing means it becomes possible to select the length between Nth division point and (N+1)th division point. Consequently, it is possible to realize such a recording apparatus which can provide compatibility among different types of apparatuses and enables an arbitrary search position to be provided while performing a continuous recording.

(3) In a reproducing apparatus according to the invention, such a control is performed that the digital data is read from the storage means into the buffer memory at a reading speed which is higher than the speed at which the data is outputted from the buffer memory to the outside to thereby output a plurality of files of digital data stored in the storage means to the outside as digital data in a continuous form.

Thus, the digital data is read from the storage means into the buffer memory at a reading speed which is higher than the speed at which the data is outputted from the buffer memory to the outside, so that no interruption of reproduction will occur at the time of transition to the next file even when a plurality of files are successively reproduced. Therefore, even when a certain time is needed for the file processing such as processing to stop reproducing the directly preceding file and processing to start reproducing the current file at the position to be searched for, no problem will arise.

In addition, since a file division system is employed in this reproducing apparatus to carry out a search in lieu of the index mark file system, compatibility among different types of apparatuses is established. Furthermore, since there is no limit about the number of marks as in the index mark file system, reproduction can be started at any of as-many-as necessary search points. Thus, it becomes possible to realize such a reproducing apparatus which can provide compatibility among different types of apparatuses, can achieve a search for any arbitrary position and can reproduce a plurality of files in a continuous manner.

(4) In a recording/reproducing apparatus according to the invention, such a control is performed that the digital data continuously received and stored in the buffer memory is stored in the storage means at a writing speed, which is higher than the speed at which the digital data has been stored in the buffer memory, while being divided into files in response to the division command from the manual input means. Also, such a control is performed that the digital data is read from the storage means into the buffer memory at a reading speed which is higher than the speed at which the data is outputted from the buffer memory to the outside to thereby output a plurality of files of digital data stored in the storage means to the outside as digital data in a continuous form.

Thus, the control is made such that the digital data is stored in the storage means at the writing speed higher than the speed during being stored in the buffer memory wherein the digital data is divided into files at each instant of division command, so that no missing part will occur in the recording even when a continuous signal is being received. Therefore, even when a certain time is needed for the file closing and file opening processing to stop recording the directly preceding file and to start recording the current file at the position to be searched for, no problem will arise.

Furthermore, the digital data is read from the storage means into the buffer memory at a reading speed which is higher than the speed at which the data is outputted from the buffer memory to the outside, so that no interruption of reproduction will occur at the time of transition to the next file even when a plurality of files are successively reproduced. In other words, even when a certain time is needed for the file processing such as processing to stop reproducing the directly preceding file and processing to start reproducing the current file at the position to be searched for, no problem will arise.

In addition, since a file division system is employed for a position search in lieu of the index mark file system, compatibility among different types of apparatuses is established. Furthermore, since the limit of the number of marks in the index mark file system is now not relevant, any desired number of search positions can be provided. Likewise, since there is no limit about the number of marks as in the index mark file system, reproduction can be started at any of as-many-as necessary search points. Thus, it becomes possible to provide a recording/reproducing apparatus which can provide compatibility among different types of apparatuses, enables an arbitrary search position to be provided while carrying out a continuous recording, and can reproduce a plurality of files in a continuous manner.

(5) In another recording/reproducing apparatus according to the invention, such a control is carried out that the digital data continuously received and stored in the buffer memory is stored in the storage means at a writing speed higher than the speed at which the data was stored in the buffer memory, while being divided into files in response to the division timing signals from the division managing means. Also, such a control is performed that the digital data is read from the storage means into the buffer memory at a reading speed which is higher than the speed at which the data is outputted from the buffer memory to the outside to thereby output a plurality of files of digital data stored in the storage means to the outside as digital data in a continuous form.

By virtue of the above control for storing the digital data into the storage means at a speed higher than the speed of storing into the buffer memory while dividing into files in response to the division timing signals, no missing part will occur in the recording even when a continuous signal is received. Thus, even when a certain time is needed for the file closing and file opening processing to stop recording the directly preceding file and to start recording the current file at the position to be searched for, no problem will arise.

Furthermore, the digital data is read from the storage means into the buffer memory at a reading speed which is higher than the speed at which the data is outputted from the buffer memory to the outside, so that no interruption of reproduction will occur at the time of transition to the next file even when a plurality of files are successively reproduced. In other words, even when a certain time is needed for the file processing such as processing to stop reproducing the directly preceding file and processing to start reproducing the current file at the position to be searched for, no problem will arise.

In addition, since a file division system is employed to carry out a search in lieu of the index mark file system, compatibility among different types of apparatuses is established. Furthermore, since there is not limit to the number of search positions by the number of markers in the file division system, it is possible to provide search positions as many as necessary. Likewise, since there is no such limit about the number of marks as in the index mark file system, reproduction can be started at any of as-many-as necessary search points.

In this apparatus, the division timing signal for dividing the digital data at an arbitrary instant is generated by the division managing means, so that a division into files at an intended instant can be achieved without the need for the operator's skill. Consequently, the operator is released from the operations for creating files which the operator should have performed sitting in front of the apparatus all the time, and it will become possible to perform a division into files at an appropriate instant determined based on an objective judgment. In addition, by virtue of the automatic division into files by the division managing means it becomes possible to select a length between an Nth division point and an (N+1)th division point. Consequently, it is possible to realize such a recording/reproducing apparatus which can provide compatibility among different types of apparatuses, enables any arbitrary search position to be provided while performing a continuous recording, and can reproduce a plurality of files in a continuous manner.

What is claimed is:

1. A recording apparatus for recording a received signal as digital data in a file format, comprising:
    a buffer memory for temporarily storing the received signal as digital data;
    a storage unit for storing the digital data in the file format;
    a memory controller for performing a control causing the digital data temporarily stored in said buffer memory to be stored in said storage unit in the file format; and
    a manual input device for inputting a division command for dividing the digital data at an arbitrary instant in order to store the digital data in said storage unit as files divided one from another, while said buffer memory receives the signal continuously; wherein
    said memory controller carries out the control in such a manner that the digital data continuously stored in said buffer memory is stored in said storage unit at a writing speed which is higher than a speed at which the digital data is stored in said buffer memory, to thereby allow the digital data continuously stored in said buffer memory to be stored as said files divided at the arbitrary instant corresponding to the division command from said manual input device.

2. A recording apparatus according to claim 1, further comprising:
    a division managing device for generating a division timing signal for dividing the digital data at an arbitrary instant in order to store the digital data in said storage unit as said files divided one from another;
    wherein said memory controller carries out the control in such a manner that the digital data continuously stored in said buffer memory is stored in said storage unit at a writing speed which is higher than a speed at which the digital data is stored in said buffer memory, to thereby allow the digital data continuously stored in said buffer memory to be stored as said files divided at the arbitrary instant corresponding to the division timing signal from said division managing device.

3. A recording apparatus according to claim 2, wherein said division managing device generates said division timing signal at a predetermined time interval or at each of preset time instants.

4. A recording apparatus according to claim 2, wherein said division managing device generates said division timing signal when a predetermined change in environmental condition has occurred or when a predetermined signal is received from the outside.

5. A recording apparatus according to claim 2, wherein said division managing device comprises an artificial intelligence fuzzy-judgment device which generates said division timing signal based on an automatic judgment.

6. A recording apparatus according to any one of claims 2 to 5, wherein said memory controller performs the control of dividing the digital data in response to the division command from said manual input means or the division timing signal from said division managing device.

7. A recording apparatus according to claim 1, wherein the files from a continuous signal are stored in a single directory in said storage unit.

8. A recording apparatus according to claim 1, wherein the files from a continuous signal are stored in said storage unit with sequential numbers, respectively.

9. A recording/reproducing apparatus for recording a received signal as digital data in a file format and for reproducing the digital data stored in a file format comprising:
    a storage unit for storing the digital data in the file format;
    a buffer memory for temporarily storing the received signal in a recording mode and for temporarily storing the digital data read from said storage unit in a reproducing mode;
    a manual input device for inputting a division command for dividing the digital data at an arbitrary instant in the recording mode in order to store the digital data in said storage means as files divided one from another, while said buffer memory receives the signal continuously; and
    a memory controller for performing a first control causing the digital data temporarily stored in said buffer memory to be stored in said storage unit in the file format in the recording mode and for performing a second control to cause the digital data stored in said storage unit to be temporarily stored in said buffer memory in order to allow the digital data to be outputted in the reproducing mode; wherein
    said memory controller carries out the first control in the recording mode in such a manner that the digital data continuously received and stored in said buffer memory is stored in said storage at a writing speed which is higher than a speed at which the digital data is stored in said buffer memory, to thereby allow the digital data continuously stored in said buffer memory to be stored as said files divided at the arbitrary instant corresponding to the division command from said manual input device, and said memory controller further carrying out the second control in the reproducing mode in such a manner that the digital data is read from said storage means at a reading speed which is higher than a speed at which the digital data is outputted from said buffer memory to thereby allow the files of digital data dividedly stored in said storage unit to be outputted as continuous digital data.

10. A recording/reproducing apparatus according to claim 9, further comprising
    a division managing device for generating a division timing signal for dividing the digital data at an arbitrary instant in order to store the digital data in said storage means as files divided one from another; and
    wherein said memory controller carries out the first control in the recording mode in such a manner that the digital data continuously received and stored in said buffer memory is stored in said storage unit at a writing speed which is higher than a speed at which the digital data is stored in said buffer memory, to thereby allow the digital data continuously stored in said buffer memory to be stored as said files divided at the arbitrary instant corresponding to the division timing signal from said division managing device, and said control means further carrying out the second control in the reproducing mode in such a manner that the digital data is read from said storage unit at a reading speed which is higher than a speed at which the digital data is outputted from said buffer memory to thereby allow the files of digital data dividedly stored in said storage means to be outputted as continuous digital data.

11. A recording/reproducing apparatus according to claim 10, wherein said division managing device generates said division timing signal at a predetermined time interval or at each of preset time instants.

12. A recording/reproducing apparatus according to claim 10, wherein said division managing device generates said division timing signal when a predetermined change in environmental condition has occurred or when a predetermined signal is received from the outside.

13. A recording/reproducing apparatus according to claim 10, wherein said division managing device comprises an artificial intelligence fuzzy-judgment device which generates said division timing signal based on an automatic judgment.

14. A recording/reproducing apparatus according to any one of claims 10 to 13, wherein said memory controller performs the control of dividing the digital data in response to the division command from said manual input device or the division timing signal from said division managing means device.

15. A recording apparatus for recording a received signal as digital data in a file format, comprising:

a buffer memory for temporarily storing the received signal as digital data;

a storage unit for storing the digital data in the file format;

a memory controller for performing a control causing the digital data temporarily stored in said buffer memory to be stored in said storage unit in the file format; and a manual input device for inputting a division command for dividing the digital data at an arbitrary instant in order to store the digital data in said storage unit as files divided one from another, while said buffer memory receives the signal continuously; wherein said memory controller carries, out the control in such a manner that the digital data continuously stored in said buffer memory is stored as files divided at the arbitrary instant corresponding to the division command from said manual input device.

* * * * *